April 15, 1947. J. H. CANTLIN 2,418,817
SAFETY DEVICE FOR FIRE EXTINGUISHER VALVE
Filed April 20, 1944 2 Sheets-Sheet 1
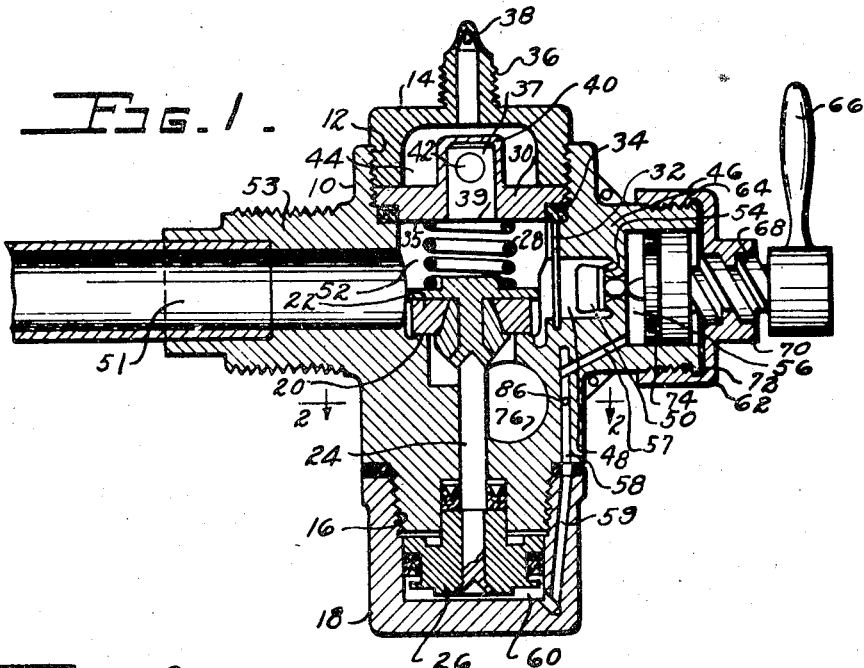
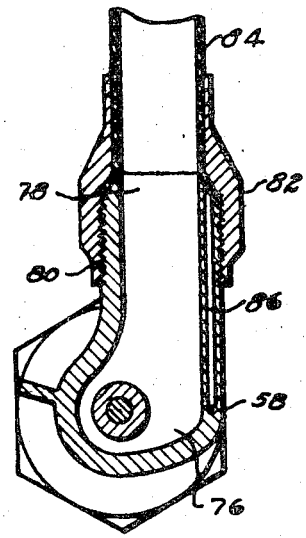
INVENTOR.
JOHN H. CANTLIN
BY
ATTORNEYS April 15, 1947.   J. H. CANTLIN   2,418,817
SAFETY DEVICE FOR FIRE EXTINGUISHER VALVE
Filed April 20, 1944   2 Sheets-Sheet 2
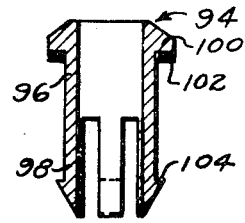
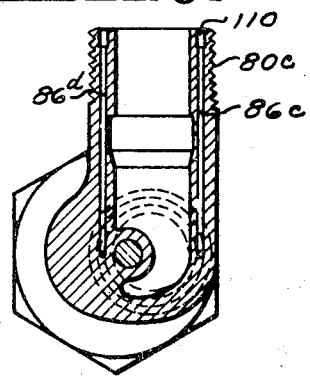
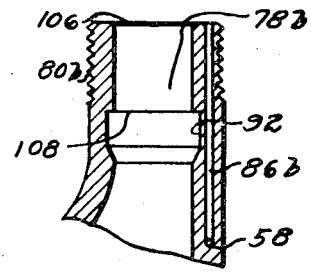
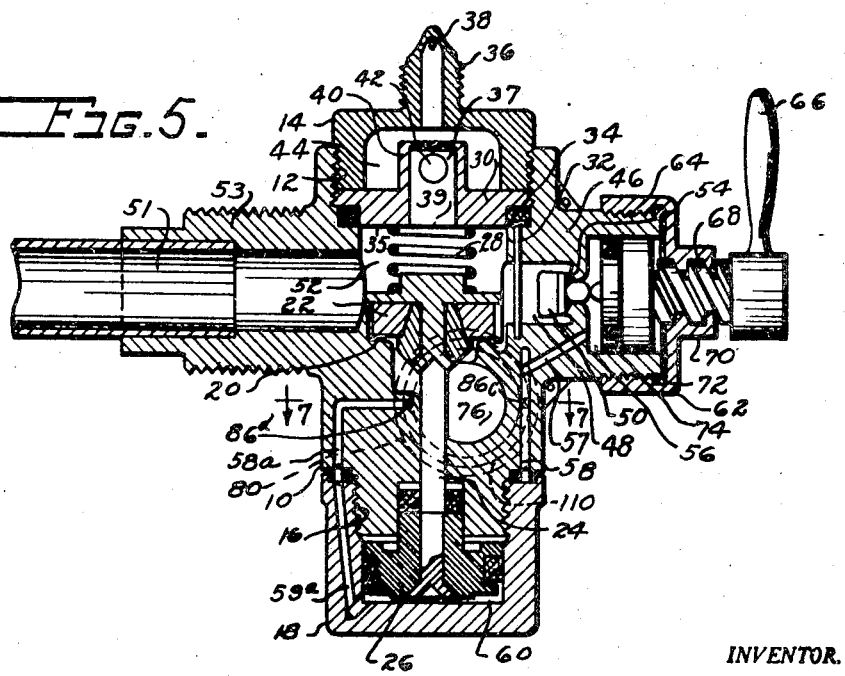
INVENTOR.
JOHN H. CANTLIN
BY
ATTORNEYS Patented Apr. 15, 1947

2,418,817

UNITED STATES PATENT OFFICE 2,418,817

SAFETY DEVICE FOR FIRE EXTINGUISHER VALVES

John H. Cantlin, Auburn, Maine, assignor to Walter Kidde & Company, Inc., a corporation of New York Application April 20, 1944, Serial No. 531,965

4 Claims. (Cl. 137—69)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to fire extinguisher valves, having particular reference to a safety feature for preventing accidental discharge through a valve of this kind.

An object of the invention is to provide such a safety feature by a minor change in construction, which is, however, so slight as to add substantially nothing to the cost either in labor or material.

Other objects and advantages will become evident as the invention is further described with reference to the drawings, wherein Fig. 1 is an axial section through a valve containing the improved feature of subject invention.

Fig. 2 is a transverse section, through the same valve, taken at 2—2 of Fig. 1 showing the improvement.

Figs. 3 and 4 are parts of an assembly whereby the invention is carried out in a slightly different manner.

Figs. 5 and 6 show still another modification of the invention.

Like reference characters refer to like parts throughout the several views.

Referring particularly to Fig. 1, a valve body 10 has internal threads 12 at the upper end for the externally threaded plug 14, and external threads 16 at the lower end for the internally threaded cap 18.

A valve seat 20 is formed in the body, about midway of its length, for the main valve head 22. Head 22 is supported on a stem 24 which, at its lower end, carries a piston 26 which is slidable in a bore in the cap 18. A spring 28 holds the main valve head 22 on its seat 20, and the piston 26 in its lower position. A member 30, held in place by the plug 14 takes the upward reaction of the spring 28. A packing ring 34 is interposed between the member 30 and a shoulder in the body 10. A hub 40 on top of the member 30 has transverse holes 42 through which fluid may pass into the space 44. A thin frangible disc 35 on the underside of the member 30 closes the passageway 37 through the hub 40. Disc 35 is made of a selected material of a carefully determined thickness so that when the pressure on the underside of the disc becomes excessive, a small disc of the diameter of the passageway 39 will shear from the disc 35 and be carried upward and stopped by the enclosed upper end of the hub 40. The excess pressure will then be relieved through the transverse hole 42, space 44, and transverse holes 38 in the nipple 36.

Extending laterally from the body 10 is a hub 46 which has an opening 48 which contains the auxiliary valve head 50. Opening 48 is in direct communication with the space 52 above the main valve head 22, which is in direct communication with the source of supply of fluid under pressure which enters through the opening 51 of the threaded hub 53. The valve head 50 is normally held on its seat 54 by pressure within the space 52, the stem extending loosely through and into the larger space 56. A pin 32 limits the movement of the valve head 50. When the auxiliary valve head 50 is pushed off its seat 54, fluid pressure escapes into the space 56 and thence through the small connected passages 57, 58 and 59 into the space 60 under the piston 26, whereby the piston moves upward and raises the main valve head 22 off its seat 20.

The means for manually raising the auxiliary valve head 50 off its seat 54 comprises a cap 62, internally threaded to screw over the external threads 64 of the hub 46. A handle 66 has an extending portion provided with a coarse multiple threaded part 68 fitted to corresponding internal threads in the hub 70. The inner end of the threaded part 68 bears upon a disc 72, the inner end of which meets the stem of the valve head 50, whereby when the handle 66 is turned through about one fourth turn, the valve head 50 is raised from its seat 54. A seal 74 is preferably provided to prevent leakage past the disc 72.

When the auxiliary valve is thus manually raised off its seat and the leakage pressure through the passageway 58 raises the piston 26, and thus raises the main valve head 22 off its seat, the fluid entering the opening 51 passes into the space 76 and out through the opening 78 of a laterally extending hub 80, through the hose coupling 82 and hose 84.

A small passageway 86 extends from the small passageway 58 through the wall of the hollow hub 80 coming out through the beveled outer edge of the hub (see Fig. 2). The hose 84 and coupling 82 are so formed that, when the coupling is screwed up tight, the passageway 86 is closed and of no effect. When, however, the hose coupling 82 is off or partly unscrewed, the passageway 86 allows the gas to escape from the space 60 under the piston 26 and the main valve head 22 instantly seats and prevents all flow through the valve.

It will be apparent that there can be no flow through the valve unless the hose coupling 82 is screwed up tight. Whether the hose coupling is unscrewed while the manual handle 66 is holding the auxiliary valve 50 open, or whether the manual handle 66 is inadvertently operated while the hose coupling is off, the result is the same, i. e., there will be no flow through the valve. This is an important feature of the invention.

As a modification of subject invention, the hose connection hub may be made as shown at 80b of Fig. 3, where a bore 78b is counterbored as at 92, the small passage 86b extending from the outer face of the hub to the passageway 58 as before. Instead, however, of closing the outer end of the passageway 86b with the hose coupling itself, as shown in the exemplification of Fig. 2, a separate closing member 94, Fig. 4, is employed.

Closing member 94 consists of a sleeve 96 with integral spring tempered hooks at the lower end and a head 100 at the top, the underside of the head being provided with a seal washer 102. The hooks 98 are flexible enough to permit being forced through the bore 78b until they may expand into the counterbore 92, the body portion 96 being slidable in the bore 78b. The distance between the washer 102 and the shoulder 104 of the hook is greater than the distance from the outer face 106 of the hub to the edge 108 of the counterbore. The member 94 therefore has limited axial movement after it is assembled in the hub, whereby it may be either drawn up by the hose connection 82, to seal the small passageway 86b, or it may move outward slightly to unseal the passageway when the hose coupling is unscrewed.

The operation of the valve shown in Figs. 1 and 2 is as follows:

Assume that the passage 51 is connected to a source of supply of fluid under appropriate pressure and that the hose coupling 82 is screwed up tight. The handle 66 is operated to unseat the auxiliary valve head 50, whereby the fluid flows into the space 56, then through the passageway 57—58—59 to the space 60 under the piston 26 which raises the main valve head 22 off the seat 20.

Should the operator inadvertently unscrew the hose coupling at this time, the outer end of the passageway 86 is uncovered and the pressure in the space 60 under the piston 26 immediately drops and the main valve head 22 seats itself, thus shutting off flow through the valve.

On the other hand, if the hose coupling 82 is already off or partly unscrewed when the handle 66 is operated, no sufficient pressure will build up in the space 60 to overcome the spring 28 as long as the passageway 86 is open, and the main valve will therefore not open.

Where the modification shown in Figs. 3 and 4 is used, screwing up of the hose coupling 82 presses the seal washer 102 over the outer end of the passageway 86b, while upon removal of the hose coupling 82 the pressure forces the seal washer 102 and the closing member 94 away from the end of the passageway until the closing member is stopped by the hooks 98.

In constructing a valve as shown in Figs. 1 and 2, or as modified in Figs. 3 and 4, care must be taken that the passageway 86 is made large enough, and that the auxiliary valve head 50 is lifted little enough to insure that the fluid which escapes past the valve 50 may all pass through the passageway 86 as fast as it comes through the valve, for otherwise enough fluid may be forced downward through the passageway 58—59 to lift the piston 26 against the resistance of the spring 28 and thus open the main valve while the hose coupling is not in place or, if in place, has not been tightened.

In Figs. 5 and 6 there is shown a rearrangement of the passageways whereby the degree which the auxiliary valve head 50 is raised from its seat is not so critical. Here, in addition to the passageway 86c, a similar passageway 86d is provided, the two passageways having their outer ends connected by a deep groove 110 formed in the end of the hose coupling hub 80c. The passageway 59 is then eliminated and in its stead the passageways 58a and 59a are provided for connecting the additional passageway 86d to the space under the piston 26.

The modification shown in Figs. 5 and 6 operates as follows:

If the auxiliary valve is opened while the hose coupling 82 is removed, fluid passing the valve head 50 will all have to pass out through the passageway 86c. No fluid may be forced through the passageways 58a and 59a by way of the groove 110 because, when the hose coupling is removed, one side of the groove 110 is open.

On the other hand, if the hose coupling is inadvertently removed after the auxiliary valve has been open long enough to have raised the piston 26 and opened the main valve, the fluid entering through the auxiliary valve will all pass out through the passageway 86c, while fluid under the piston 26 will be ejected by the spring 28 through the passageways 59a, 58a and 86d.

I claim:

1. The combination, in a valve, of a valve body having an inflow and an outflow passageway, a removable connection attachable to said outflow passageway, a main valve openable for connecting said inflow to said outflow passageway, a fluid expansible means for opening said main valve, a passageway for conveying fluid under pressure from the inflow passageway to said fluid expansible means, means actuable at the will of the operator for directing fluid under pressure from said inflow passageway through said fluid conveying passageway to said fluid expansible means for expanding said fluid expansible means for opening said main valve, and a pressure bleeding passageway connecting said fluid conveying passageway to a position adjacent said removable connection operative to be opened by loosening said removable connection to relieve said fluid expansible means of said fluid under pressure to prevent said main valve being open.

2. The combination, in a valve, of a valve body having an inflow passageway and a hub containing an outflow passageway, a removable connection attachable to said hub over said outflow passageway, a main valve openable for connecting said inflow to said outflow passageway, a fluid expansible means for opening said main valve, a passageway for conveying fluid under pressure from the inflow passageway to said fluid expansible means, means actuable at the will of the operator for directing fluid under pressure from said inflow passageway through said fluid conveying passageway to said fluid expansible means for expanding said fluid expansible means for opening said main valve, and a pressure bleeding passageway extending from said fluid conveying passageway axially through the wall of said hub and out the end thereof, said removable connection being so constructed and arranged that it closes the outer end of said bleeding passageway tightly only when said connection is fully attached.

3. The combination, in a valve, of a valve body having an inflow passageway and a hub containing an outflow passageway, a removable connection attachable to said hub over said outflow passageway, a main valve openable for connecting said inflow to said outflow passageway, a fluid expansible means for opening said main valve, a passageway for conveying fluid under pressure from the inflow passageway to said fluid expansible means, means actuable at the will of the operator for directing fluid under pressure from said inflow passageway through said fluid conveying passageway to said fluid expansible means for expanding said fluid expansible means for opening said main valve, a pressure bleeding passageway extending from said fluid conveying passageway axially through the wall of said hub and out the end thereof, a flanged sleeve slidable in the outflow passageway within said hub, the flange being adapted to cover the end of the hub for tightly closing said bleeding passageway only when said removable connection is fully attached.

4. The combination, in a valve, of a valve body having an inflow passageway and a hub containing an outflow passageway, a removable connection attachable to said hub over said outflow passageway, a main valve openable for connecting said inflow to said outflow passageway, a fluid expansible means for opening said main valve, a passageway for conveying fluid under pressure from the inflow passageway to said fluid expansible means, means operable at the will of the operator for directing fluid under pressure from said inflow passageway through said fluid conveying passageway to said fluid expansible means for expanding said fluid expansible means for opening said main valve, a pressure bleeding passageway extending from said fluid conveying passageway axially through the wall of said hub and out the end thereof, a flanged sleeve slidable in the outflow passageway within said hub, the flange being adapted to cover the end of the hub for tightly closing said bleeding passageway, and means on said flanged sleeve to limit movement of said flange away from the end of said hub, said removable connection being adapted to hold said flange to the end of said hub to cover said pressure bleeding passageway only when said connection is fully attached.

JOHN H. CANTLIN.

REFERENCES CITED

The following references are of record in the file of this patent:

UNITED STATES PATENTS

| Number | Name | Date |
|---|---|---|
| 1,647,189 | Mueller | Nov. 1, 1927 |
| 2,291,619 | Grant | Aug. 4, 1942 |

Certificate of Correction

Patent No. 2,418,817.  April 15, 1947.

JOHN H. CANTLIN

It is hereby certified that the above numbered patent was erroneously issued to "Walter Kidde & Company, Inc., a corporation of New York," as assignee of the entire interest therein whereas said patent should have been issued to the inventor "*John H. Cantlin*"; and that the said Letters Patent should be read with this correction therein that the same may conform to the record of the case in the Patent Office.

Signed and sealed this 3rd day of June, A. D. 1947.

[SEAL]

LESLIE FRAZER,
*First Assistant Commissioner of Patents.*